(12) United States Patent
Kang

(10) Patent No.: US 10,993,452 B2
(45) Date of Patent: May 4, 2021

(54) BUTTER CREAM FOR MAKING CAKE AND METHOD FOR MAKING SAME

(71) Applicant: Joo Hee Kang, Seoul (KR)

(72) Inventor: Joo Hee Kang, Seoul (KR)

(73) Assignee: Joo Hee Kang, Seoul (KR)

( * ) Notice: Subject to any disclaimer, the term of this patent is extended or adjusted under 35 U.S.C. 154(b) by 558 days.

(21) Appl. No.: 15/572,392

(22) PCT Filed: Apr. 27, 2016

(86) PCT No.: PCT/KR2016/004404
§ 371 (c)(1),
(2) Date: Nov. 7, 2017

(87) PCT Pub. No.: WO2016/182233
PCT Pub. Date: Nov. 17, 2016

(65) Prior Publication Data
US 2018/0116239 A1 May 3, 2018

(30) Foreign Application Priority Data

May 8, 2015 (KR) .................. 10-2015-0064452

(51) Int. Cl.
*A23C 13/12* (2006.01)
*A23C 15/06* (2006.01)
*A23P 30/40* (2016.01)

(52) U.S. Cl.
CPC .............. *A23C 13/12* (2013.01); *A23C 15/06* (2013.01); *A23P 30/40* (2016.08)

(58) Field of Classification Search
CPC .................................................. A23L 15/20
See application file for complete search history.

(56) References Cited

U.S. PATENT DOCUMENTS

2003/0215554 A1  11/2003  McCarrick

FOREIGN PATENT DOCUMENTS

KR  10-2011-0095227 A  8/2011
KR  10-2013-0102538 A  9/2013

OTHER PUBLICATIONS

Wilson, D., "Italian Meringue Buttercream", https://www.bakepedia.com/italian-meringue-buttercream-recipe/, Jul. 23, 2013 (Year: 2013).*
Pfeiffer, J., The Art of French Pastry, Knopf/Random House, 2013 (Year: 2013).*

(Continued)

*Primary Examiner* — Jeffrey P Mornhinweg
(74) *Attorney, Agent, or Firm* — Martin & Ferraro, LLP

(57) ABSTRACT

The present invention relates to butter cream for making a cake and a method for preparing the same, and an exemplary embodiment according to the present invention may provide butter cream for making a cake, which may be prepared by adding first sugar to meringue having bubbles formed by whipping egg whites, preparing first sweetened meringue by whipping the mixture until a meringue cone is formed on the meringue, obtaining second sweetened meringue by adding sugar syrup, which is obtained by mixing water and second sugar and then heating the mixture, to the first sweetened meringue, and whipping the mixture; and adding butter to the second sweetened meringue, and then whipping the mixture until moisture is reduced.

11 Claims, 6 Drawing Sheets

(56) References Cited

OTHER PUBLICATIONS

"All about the G.G. Glossy Buttercream", G.G. Cakraft, Mar. 24, 2019, https://www.youtu.be/Ldc75yT5Exw (Year: 2019).*
International Search Report for PCT/KR2016/004404 dated Jul. 19, 2016.
Korea Bakery Association, "Bakery," vol. 428, p. 136-137, Mar. 2004.
Culinary Society of Korea, "The Korean Journal of Culinary Research," vol. 3, p. 367-383, Dec. 1997.

* cited by examiner

BUTTER CREAM FOR MAKING CAKE AND METHOD FOR MAKING SAME

This is a National Phase Application under 35 USC 371 of PCT/KR2016/004404 filed Apr, 27, 2016 (published on Nov. 17, 2016 as WO 2016/182233); which claims priority to Korean Application No. 10-2015-0064452 filed May 8, 2015; all of which are incorporated by reference herein in their entirety.

TECHNICAL FIELD

The present invention relates to butter cream and a method for preparing the same, and more particularly, to butter cream for making a flower cake and a method for preparing the same.

BACKGROUND ART

Cream is a generic name for creams including fresh cream, and generally, is widely used in the confectionery and bakery field. Examples of the creams include custard cream, butter cream, fat-free cream, cream in the form of jam, and the like. Among them, custard cream or fresh cream may be used by being applied to the surface of bread or by filling the inside of bread with custard cream or fresh cream. Further, butter cream is also used as a material for decorating cakes.

Further, many types of creams are used by being applied to the surfaces of breads, pies, confectionery, and the like or by filling the insides of breads, pies, confectionery, and the like in order to improve the texture and taste of the confectionery and bakery products. In general, the main materials for cream are milk, fresh cream, eggs, sugar, butter, and the like, and alcohols, flavor, chocolate, fruits, nuts, flour, and gelatin are blended with the main materials in order to add flavoring to the main materials and change the taste. For example, butter cream is prepared by putting sugar into water and heating the water to dissolve the sugar, concentrating the solution at approximately 105° C. and cooling the concentrated solution to prepare sugar syrup, mixing butter, which is a solid fat, by using a blender to generate bubbles in the state of cream, allowing the cooled sugar syrup to gradually flow in the bubbly butter, and adding flavor and wine thereto.

Meanwhile, the term "icing" refers to applying a material such as cream to cake itself or flowing and attaching the material to the cake. Further, the term "decoration" refers to squeezing colored icing on the surface of an iced cake sheet to make various shapes, and ornamenting the iced cake sheet with handiwork having various shapes. Cakes completed through the work are called decoration cakes, and Christmas cakes, wedding cakes, birthday cakes, and the like belong to the category.

A type of icing for the squeezing includes royal icing, butter cream, fondant, water icing, meringue, and the like. In addition, examples of the handiwork include those made from marzipan, macaroon, gum paste, meringue, or sugar paste. The shape or form of decoration varies according to the use of cake, and for example, Christmas cakes are decorated with Santa Claus, socks, stars, and the like, wedding cakes are decorated with a groom, a bride, horse-drawn carriages, heart, flowers, and the like, and Easter cakes are decorated with eggs, chicks, rabbits, and the like. However, in the related art, when cakes are decorated with flowers by using butter cream, transparency or gloss is not appropriately expressed, so that it is difficult to make an aesthetic impression on a user or to induce the user to buy the product.

CITATION LIST

Korean Patent Application Laid-Open No.: 1020130102538

DISCLOSURE

Technical Problem

A problem to be solved by an exemplary embodiment of the present invention is to provide butter cream for making a cake, which is excellent in gloss of the surface of the cake and may further enrich the texture and taste of the cake when making the cake using butter cream.

A problem to be solved by another exemplary embodiment of the present invention is to provide butter cream for making a cake, which is excellent in storage stability by maintaining intrinsic properties even when the butter cream is stored in a refrigerator for a long period of time.

A problem to be solved by still another exemplary embodiment of the present invention is to provide a method for preparing butter cream for making a cake, which may shorten the time for preparing butter cream by simplifying a preparation process.

Technical Solution

An exemplary embodiment according to the present invention may provide butter cream for making a cake, which is prepared by adding first sugar to meringue having bubbles formed by whipping egg whites, and then preparing first sweetened meringue by whipping the mixture until a meringue cone is formed on the meringue, obtaining second sweetened meringue by adding sugar syrup, which is obtained by mixing water and second sugar and then heating the mixture, to the first sweetened meringue, and whipping the mixture, and adding butter to the second sweetened meringue, and then whipping the mixture until moisture is reduced.

In an exemplary embodiment, the egg whites may be present in an amount of 135 g to 155 g parts by weight, the first sugar may be present in an amount of 20 g to 40 g parts by weight, the water may be present in an amount of 25 g to 45 g parts by weight, the second sugar may be present in an amount of 120 g to 140 g parts by weight, and the butter may be present in an amount of 440 g to 460 g parts by weight.

In another exemplary embodiment, the egg whites may be whipped in a state of being maintained at 20° C. to 23° C.

In still another exemplary embodiment, the butter may be whipped after being added in a state of being maintained at 0° C. to 12° C.

In yet another exemplary embodiment, the second sweetened meringue may be obtained by adding the sugar syrup to the first sweetened meringue, whipping the mixture until the temperature becomes 0° C. to 30° C., and adding the butter thereto.

In still yet another exemplary embodiment, the water and the second sugar may be mixed and then heated at 118° C. to 120° C.

A further exemplary embodiment according to the present invention may provide a method for preparing butter cream for making a cake, the method including: preparing meringue having bubbles formed by whipping egg whites; obtaining first sweetened meringue by adding first sugar to the meringue, and then whipping the mixture until a meringue cone is formed on the meringue; obtaining second sweetened meringue by adding sugar syrup, which is obtained by mixing water and second sugar and then heating the mixture, to the first sweetened meringue, and whipping the mixture; and adding butter to the second sweetened meringue, and then whipping the mixture until moisture is reduced.

In an exemplary embodiment, the whipping of the mixture until the moisture is reduced may be carried out until the butter may absorb the moisture, and may further include obtaining butter cream after the moisture is completely absorbed in the butter. In another exemplary embodiment, the preparing of the meringue having bubbles formed by whipping the egg whites may be preparing the meringue by whipping the egg whites in a state of being maintained at 20° C. to 23° C.

In still another exemplary embodiment, the adding of the butter to the second sweetened meringue, and then the whipping of the mixture until the moisture is reduced may be whipping the mixture after the butter is added in a state of being maintained at 0° C. to 12° C.

In yet another exemplary embodiment, the obtaining of the second sweetened meringue may be obtaining the second sweetened meringue by adding the sugar syrup to the first sweetened meringue, whipping the mixture until the temperature becomes 0° C. to 30° C., and adding the butter thereto.

In a further exemplary embodiment, the mixing of the water and the second sugar, and then the heating of the mixture may be heating the mixture at 118° C. to 120° C.

Advantageous Effects

When a cake is made from the butter cream for making a cake according to an exemplary embodiment of the present invention, gloss on the surface of the cake is excellent, and the texture and taste of the cake may be further enriched.

The butter cream for making a cake according to another exemplary embodiment of the present invention is excellent in storage stability by maintaining intrinsic properties even when the butter cream is stored in a refrigerator for a long period of time.

The method for preparing butter cream for making a cake according to still another exemplary embodiment of the present invention may shorten the time for preparing butter cream by simplifying a preparation process.

The effects of the present invention are not limited to those mentioned above and any other effects unmentioned above will be apparently understood by a person skilled in the art to which the present invention belongs from the following description.

DESCRIPTION OF DRAWINGS

Various aspects are now described with reference to the drawings, in which like reference numerals are used to refer to like constituent elements throughout. In the following Examples, for purposes of explanation, numerous specific details are set forth in order to provide overall understanding of one or more aspects. It will be clear, however, that such aspect(s) can be carried out without these specific details. In other instances, publicly-known structures and devices are illustrated in the form of a block diagram in order to facilitate describing one or more aspects.

BEST MODE FOR CARRYING OUT THE INVENTION

Figure 1:
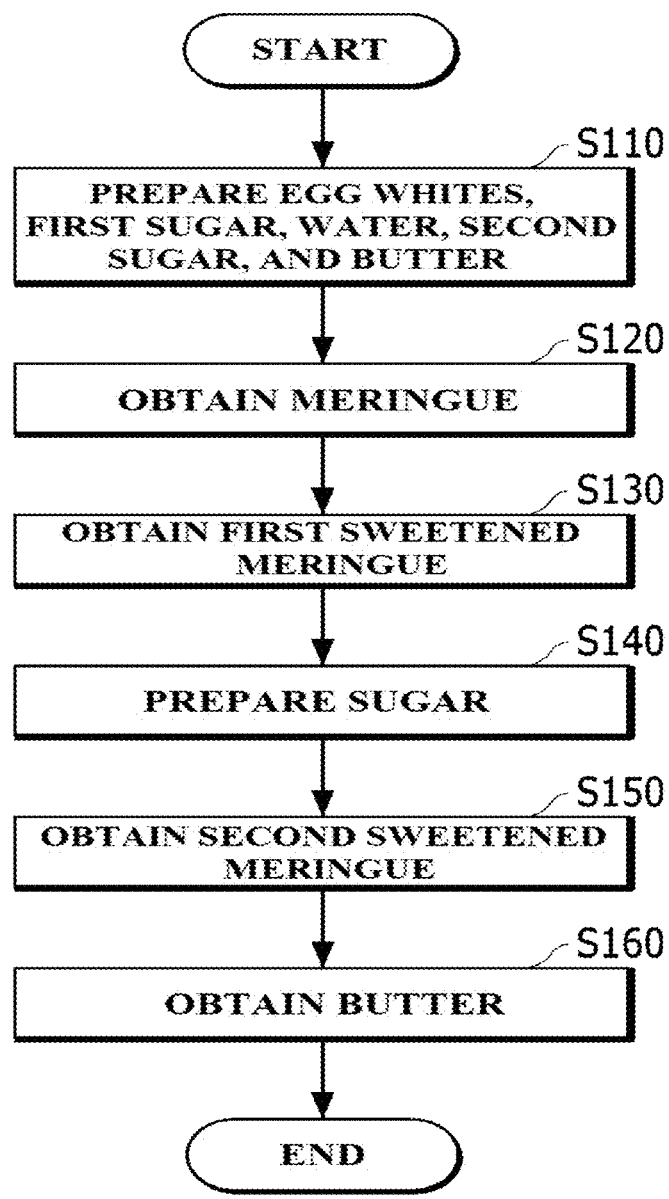
FIG. 1 is a flowchart illustrating a method for preparing butter cream for making a cake according to the present invention.

The objects and effects of the present invention and technical configurations to achieve the objects and effects will become apparent with reference to the accompanying drawings and Examples to be described below in detail. In the description of the present invention, when it is determined that the detailed description for the publicly-known function or configuration can unnecessarily obscure the gist of the present invention, the detailed description thereof will be omitted. In addition, terms to be described below are terms defined in consideration of functions in the present invention, and these may vary depending on the intention or practice of a user or operator.

However, the present invention is not limited to the Examples disclosed below, and may be implemented in various other forms. The present Examples are provided to make the disclosure of the present invention perfect and to make a person skilled in the art to which the present invention belongs perfectly comprehend the scope of the present invention, and the present invention is defined only within the scope of the claims. Therefore, the present invention should be defined based on the entire content disclosed in the present specification.

Butter cream for making a cake according to the present invention may include egg whites, sugar, water, and butter.

In order to prepare butter cream according to the present invention, meringue having bubbles formed by whipping egg whites is prepared. Here, the egg whites may be used in an amount of 135 g to 155 g parts by weight. Preferably, the egg whites may be used in an amount of 140 g to 150 g parts by weight, and more preferably, the egg whites may be used in an amount of 145 g parts by weight.

In the present specification, since the g parts by weight means a relative mass value with respect to each constituent element, not a percentage, it is not required that the sum of the entire constituent elements becomes 100 g parts by weight. For example, when constituent element A is present in an amount of 150 g parts by weight and constituent element B is present in an amount of 300 g parts by weight, the ratio of A in a composition composed of A and B accounts for ⅓ of the entire composition. The egg whites are stored at room temperature for 30 minutes, and the whipping begins when the temperature of the egg whites become the same as room temperature. For example, the egg yolks are separated from the egg whites in eggs, and in a state where the temperature of the egg whites is maintained at 20° C. to 23° C. by storing the egg whites at room temperature of 20° C. to 23° C., the whipping begins. In the present invention, a whipping instrument obvious to the person skilled in the art may be used, and the right scope of the present invention is not limited to a particular whipping method.

When the egg whites are whipped in a state where the temperature of the egg whites is maintained at 20° C. to 23° C., an air layer is introduced into the egg whites, and as a result, bubbles may be formed. A state where bubbles are formed by whipping the egg whites refers to meringue. When the butter cream according to the present invention is prepared, it is preferred that the meringue is formed while the temperature of the egg whites is allowed to become 20° C. to 23° C. When the temperature of the egg whites is less than 20° C., an excessively long time is required to form the meringue, and when the temperature of the egg whites is more than 23° C., a phase separation phenomenon may occur immediately after meringue is formed. Accordingly, in order to make butter cream for making a cake according to the present invention, the egg whites are stored at room temperature of 20° C. to 23° C. for 30 minutes or more, and then whipped.

Meringue is formed by whipping egg whites, and then first sugar may be added thereto. After the first sugar is added thereto, first sweetened meringue may be obtained by whipping the mixture again until a meringue cone is formed on the meringue. In order to obtain the first sweetened meringue, 20 g to 40 g parts by weight of the first sugar may be added to the meringue. Preferably, 25 g to 35 g parts by weight of the first sugar may be added thereto, and more preferably, 30 g parts by weight of the first sugar may be added thereto.

In an additional aspect of the present invention, the sugar to be added in producing the first sweetened meringue may serve to determine the elasticity and stability of the meringue. For example, the more the sugar is contained, the more elastic the meringue becomes, and the meringue may have dense and stable particles. In an additional aspect of the present invention, when the ratio of egg whites to sugar is 1:1, the egg whites may not be easily overwhipped even if the egg whites are whipped for a long period of time and the air is excessively collected.

Meanwhile, sugar syrup is prepared by mixing water and second sugar and then heating the mixture. In order to prepare sugar syrup, 25 g to 45 g parts by weight of water and 120 g to 140 g parts by weight of second sugar may be used. Preferably, 30 g to 40 g parts by weight of water and 125 g to 135 g parts by weight of second sugar may be used, and more preferably, 35 g parts by weight of water and 130 parts by weight of second sugar may be used. For example, 35 g parts by weight of water and 130 g parts by weight of second sugar are put into a predetermined container and heated at 118° C. to 120° C.

When the water and the second sugar is heated at less than 118° C., a sanitation problem may occur because the egg whites cannot be sterilized. Further, the evaporation of moisture in the sugar syrup is reduced, so that the sugar syrup includes an excessive amount of moisture, and the stability of the second sweetened meringue to which the sugar syrup is added may deteriorate. When the water and the second sugar are heated at more than 120° C., the moisture is excessively evaporated, and as a result, the molecular structure of the sugar may be changed. That is, the sugar syrup becomes a caramel or semi-solid state and thus cannot be used. In addition, when the water and the second sugar are heated to a temperature of more than 120° C., there may occur a problem in that bubbles contained in the first sweetened meringue are destroyed. Accordingly, it is preferred to slowly add sugar syrup, which is maintained at 118° C. to 120° C., in small amounts instead of adding the sugar syrup at a time, to the first sweetened meringue.

Thereafter, second sweetened meringue may be obtained by adding the sugar syrup prepared above to the first sweetened meringue and whipping the mixture. At this time, it is preferred to obtain the second sweetened meringue by adding the sugar syrup to the first sweetened meringue, and then whipping the mixture until the temperature becomes 30° C. or less. The reason is because when butter is added to the second sweetened meringue in a state e the temperature of the second sweetened meringue is more than 30° C., the butter is completely molten, and it is impossible to have a temperature difference between the butter and the second sweetened meringue. When the temperature difference between the butter and the second sweetened meringue is small, a moisture separation phenomenon does not occur, and it is not possible to prepare glossy butter cream.

It is confirmed that the second sweetened meringue is in a state of being maintained at 30° C. or less, butter is added to the second sweetened meringue, and then the mixture is whipped until the moisture is reduced. Here, butter is added thereto in a state of being maintained at 0° C. to 12° C. Moisture is overall produced due to the temperature difference between the second sweetened meringue and the butter, and a separation phenomenon similar to uncurdled bean curd (or bean curd dregs) occurs. That is, there occurs a phenomenon in which butter particles and moisture are separated. When the temperature of butter is less than 0° C., it is difficult to mix the butter with the second sweetened meringue, and when the temperature of butter is more than 12° C., the temperature difference between the second sweetened meringue and the butter becomes so small that it is difficult for butter particles and moisture to be separated from each other. Accordingly, in order to prepare the butter cream according to the present invention, it is preferred to add butter in a state of being maintained at 0° C. to 12° C.

The fact that butter is added to the second sweetened meringue, and then the mixture is whipped until the moisture is reduced means that the mixture is whipped until the butter absorbs the moisture, and butter cream may be obtained after the moisture is completely absorbed in the butter. The butter cream according to the present invention is not perfect white cream, but displays an ivory hue (pale yellow). The butter cream displays a pale yellow color due to the property of collecting the surrounding air while the butter in a state of being maintained at 0° C. to 12° C. is whipped. As a result, in a color-mixing process required to make a flower cake from the butter cream according to the present invention, an intrinsic color of a pigment may be clearly displayed.

However, when the butter cream according to the present invention is prepared, butter needs to be whipped only until the butter absorbs moisture. When the whipping process continues to be performed even after the moisture is completely absorbed, the air is excessively collected, so that the gloss and elasticity of butter cream is extremely reduced.

FIG. 1 is a flowchart illustrating a method for preparing butter cream for making a cake according to the present invention.

Referring to FIG. 1, in Step S110, egg whites, first sugar, water, second sugar, and butter are prepared.

In Step S120, a room temperature state is maintained by storing the egg whites prepared in Step S110 at room temperature. Meringue having bubbles formed is obtained by confirming that the egg whites are maintained at room temperature, and whipping the egg whites using a whipping machine.

In Step S130, first sugar is added to the meringue obtained in Step S120. Furthermore, the mixture is whipped again until a meringue cone is formed on the meringue to which the first sugar is added. First sweetened meringue to which the first sugar is added is obtained by continuously whipping the mixture for a predetermined time.

In Step S140, sugar syrup is prepared by mixing water and second sugar at room temperature, and then heating the mixture. At this time, the sugar syrup is not stirred or shaken.

In Step S150, the mixture is whipped while putting the sugar syrup prepared in Step S140 in small amounts into the first sweetened meringue obtained in Step S130. Moreover, second sweetened meringue is obtained by performing the whipping process until the temperature becomes 30° C. or less.

In Step S160, butter is added to the second sweetened meringue obtained in Step S150. The mixture is whipped until the butter absorbs moisture, so that the moisture is reduced, and butter cream is obtained after confirming that the moisture is reduced.

Hereinafter, specific exemplary embodiments of the present invention will be described in detail. However, the right scope of the present invention is defined by the matters described in the claims, and is not limited to specific examples to be enumerated below.

Example 1

Method 1 for Preparing Butter Cream

Step 1: 140 g parts by weight of egg whites, 30 g parts by weight of first sugar, 25 parts by weight of water, 125 g parts by weight of second sugar, and 445 g parts by weight of butter were prepared.

Step 2: 140 g parts by weight of the egg whites prepared in Step 1 were left to stand at room temperature for approximately 30 minutes, and were maintained at 20° C. to 23° C. Meringue having bubbles formed was obtained by confirming that the egg whites were maintained at 20° C. to 23° C., and whipping the mixture using a whipping machine.

Step 3: 30 g parts by weight of the first sugar were added to the meringue obtained in Step 2. Furthermore, the mixture was whipped again until a meringue cone was formed on the meringue to which the first sugar was added. First sweetened meringue in which the first sugar was added to the meringue was obtained by continuously whipping the mixture for about 20 minutes.

Step 4: Sugar syrup was prepared by mixing 25 g parts by weight of water and 125 g parts by weight of second sugar at room temperature, and then heating the mixture at 118° C. to 120° C. At this time, the sugar syrup was not stirred or shaken.

Step 5: The mixture was whipped while putting about 150 g parts by weight of the sugar syrup prepared in Step 4 in small amounts into the first sweetened meringue obtained in Step 3. Second sweetened meringue was obtained by performing the whipping process in Step 5 until the temperature became 30° C. or less.

Step 6: 445 g parts by weight of butter were added to the second sweetened meringue obtained in Step 5. The mixture was whipped until the butter absorbed moisture, so that the moisture was reduced, and butter cream was obtained after confirming that the moisture was reduced. Unsalted butter was used as the butter, and the butter was stored in a refrigerated state for approximately 30 minutes, taken out, and then added to the second sweetened meringue in a state of being maintained at 0° C. to 12° C.

Example 2

Method 2 for Preparing Butter Cream

In Example 2, butter cream was prepared in the same manner as in Example 1, except that in Step 1 of Example 1, 135 g parts by weight of the egg whites, 40 g parts by weight of the first sugar, 35 g parts h weight of the water, 120 g parts by weight of the second sugar, and 460 g parts by weight of the butter were prepared.

Example 3

Method 3 for Preparing Butter Cream

In Example 3, butter cream was prepared in the same manner as in Example 1, except that in Step 1 of Example 1, 155 g parts by weight of the egg whites, 20 g parts by weight of the first sugar, 45 g parts by weight of the water, 140 g parts by weight of the second sugar, and 440 g parts by weight of the butter were prepared.

Example 4

Method 4 for Preparing Butter Cream

In Example 4, butter cream was prepared in the same manner as in Example 1, except that in Step 1 of Example 1, 150 g parts by weight of the egg whites, 35 g parts by weight of the first sugar, 40 g parts by weight of the water, 130 g parts by weight of the second sugar, and 450 g parts by weight of the butter were prepared.

Example 5

Method 5 for Preparing Butter Cream

In Example 5, butter cream was prepared in the same manner as in Example 1, except that in Step 1 of Example 1, 145 g parts by weight of the egg whites, 25 g parts by weight of the first sugar, 35 g parts by weight of the water, 125 g parts by weight of the second sugar, and 455 g parts by weight of the butter were prepared.

Examples 1 to 5 are summarized as in the following [Table 1].

TABLE 1

| Classification | Egg whites (g parts by weight) | First sugar (g parts by weight) | Water (g parts by weight) | Second sugar (g parts by weight) | Butter (g parts by weight) |
| --- | --- | --- | --- | --- | --- |
| Example 1 | 140 | 30 | 25 | 125 | 445 |
| Example 2 | 135 | 40 | 35 | 120 | 460 |
| Example 3 | 155 | 20 | 45 | 140 | 440 |
| Example 4 | 150 | 35 | 40 | 130 | 450 |
| Example 5 | 145 | 25 | 35 | 125 | 455 |

In order to clearly exhibit the excellency of the present invention, the Comparative Examples will be examined below.

Comparative Example 1

When Temperature of Butter is Maintained at Room Temperature

Step 1: 140 g parts by weight of egg whites, 30 g parts by weight of first sugar, 25 parts by weight of water, 125 g parts by weight of second sugar, and 445 g parts by weight of butter were prepared.

Step 2: 140 g parts by weight of the egg whites prepared in Step 1 were left to stand at room temperature for approximately 30 minutes, and were maintained at 20° C. to 23° C. Meringue having bubbles formed was obtained by confirming that the egg whites were maintained at 20° C. to 23° C., and whipping the mixture using a whipping machine.

Step 3: 30 g parts by weight of the first sugar were added to the meringue obtained in Step 2. Furthermore, the mixture was whipped again until a meringue cone was formed on the meringue to which the first sugar was added. First sweetened meringue to which the first sugar was added was obtained by continuously whipping the mixture for about 20 minutes.

Step 4: Sugar syrup was prepared by mixing 25 g parts by weight of water and 125 g parts by weight of second sugar at room temperature, and then heating the mixture at 118° C. to 120° C. At this time, the sugar syrup was not stirred or shaken.

Step 5: The mixture was whipped while putting about 150 g parts by weight of the sugar syrup prepared in Step 4 in small amounts into the first sweetened meringue obtained in Step 3. Second sweetened meringue was obtained by performing the whipping process in Step 5 at 30° C. or less.

Step 6: 445 g parts by weight of butter were added to the second sweetened meringue obtained in Step 5. The mixture was whipped until the butter absorbed moisture, so that the moisture was reduced, and butter cream was obtained after confirming that the moisture was reduced. Unsalted butter was used as the butter, and the butter was stored at room temperature for approximately 30 minutes, and then added to the second sweetened meringue.

In Comparative Example 1, the butter was used while being maintained in a room temperature state, unlike Example 1.

Comparative Example 2

When Mixture is Whipped at Temperature of 31° C. or More

In Comparative Example 2, a temperature of 31° C. or more was maintained when butter was added to the second sweetened meringue in the whipping process in Step 5, unlike Comparative Example 1.

Comparative Example 3

When Mixture is Whipped Even After Moisture is Reduced

In Comparative Example 3, the whipping was continuously performed even after the moisture was reduced in Step 6, unlike Comparative Example 1.

Flower cakes were made by using butter cream for making a cake prepared in <Example 1> to <Example 5> and butter cream prepared in <Comparative Example 1> to <Comparative Example 3>, and a sensory evaluation of transparency, gloss, and texture was performed as a 5-point evaluation by a panel of 10 persons. The sensory evaluation items and criteria are shown as in the following [Table 2].

TABLE 2

| Item | Point | Evaluation Criteria |
| --- | --- | --- |
| Trans-parency | 5 | The surface has a predetermined transparency, and has an impression which is similar to that of an actual product. |
| | 4 | The surface has a predetermined transparency, but does not have an impression which is similar to that of an actual product. |
| | 3 | The surface does not have a predetermined transparency, and has an impression which is similar to that of an actual product. |
| | 2 | The surface has neither a transparency nor an impression which is similar to that of an actual product. |
| | 1 | The surface has a neither transparency nor an impression which is similar to that of an actual product, and gives a feeling of rejection. |
| Gloss | 5 | The surface has a considerable glossy look, is uniformly maintained, and is not sticky. |
| | 4 | The surface has a glossy look, is uniformly maintained, and is not sticky. |
| | 3 | The surface has a glossy look, is non-uniformly maintained, and is not sticky. |

TABLE 2-continued

| Item | Point | Evaluation Criteria |
| --- | --- | --- |
| | 2 | The surface does not have a considerable glossy look, is uniformly maintained, and is sticky. |
| | 1 | The surface does not have a glossy look, is non-uniformly maintained, and is sticky. |
| Texture | 5 | Soft and gently melted in the mouth. |
| | 4 | Soft and melted well in the mouth. |
| | 3 | Slightly less soft, but melted well in the mouth. |
| | 2 | Has paste feeling, and is not melted well in the mouth. |
| | 1 | The paste feeling is strong, and roughly remains in the mouth. |

Experimental Example 1

Evaluation of Transparency

The present experiment is an experiment for observing the transparency of butter cream according to the present invention. A panel of total 10 persons was provided with flower cakes made from butter cream according to the present invention and flower cakes made from butter cream in the related art, and a satisfaction evaluation was performed in accordance with [Table 2]. The results are summarized as in the following [Table 3].

TABLE 3

| Classification | Evaluation point of transparency (average of the panel of 10 persons) |
| --- | --- |
| Example 1 | 4.0 |
| Example 2 | 4.3 |
| Example 3 | 4.2 |
| Example 4 | 4.2 |
| Example 5 | 4.4 |
| Comparative Example 1 | 1.5 |
| Comparative Example 2 | 2.0 |
| Comparative Example 3 | 2.3 |

Referring to [Table 3], Examples 1 to 5 received transparency evaluation points of 4.0 or more on average, but Comparative Examples 1 to 3 received relatively low points of 1.5 to 2.3. Accordingly, it can be seen that the butter cream according to the present invention has better transparency than that of the butter cream in the related art.

Experimental Example 2

Evaluation of Gloss

The present experiment is an experiment for observing the gloss of butter cream according to the present invention. A panel of total 10 persons was provided with flower cakes made from butter cream according to the present invention and flower cakes made from butter cream in the related art, and a satisfaction evaluation was performed in accordance with [Table 2]. The results are summarized as in the following [Table 4].

TABLE 4

| Classification | Evaluation point of gloss (average of the panel of 10 persons) |
| --- | --- |
| Example 1 | 4.1 |
| Example 2 | 4.2 |
| Example 3 | 4.3 |

TABLE 4-continued

| Classification | Evaluation point of gloss (average of the panel of 10 persons) |
|---|---|
| Example 4 | 4.4 |
| Example 5 | 4.3 |
| Comparative Example 1 | 2.5 |
| Comparative Example 2 | 2.3 |
| Comparative Example 3 | 2.7 |

Referring to [Table 4], Examples 1 to 5 received gloss evaluation points of 4.0 or more on average, but Comparative Examples 1 to 3 received relatively low points of 2.3 to 2.7. Accordingly, it can be seen that the butter cream according to the present invention has better gloss than that of the butter cream in the related art.

Experimental Example 3

Evaluation of Texture

The present experiment is an experiment for observing the texture of butter cream according to the present invention. A panel of total 10 persons was provided with flower cakes made from butter cream according to the present invention and flower cakes made from butter cream in the related art, and a satisfaction evaluation was performed in accordance with [Table 2]. The results are summarized as in the following [Table 5].

TABLE 5

| Classification | Evaluation point of texture (average of the panel of 10 persons) |
|---|---|
| Example 1 | 4.0 |
| Example 2 | 4.2 |
| Example 3 | 4.4 |
| Example 4 | 4.5 |
| Example 5 | 4.2 |
| Comparative Example 1 | 3.5 |
| Comparative Example 2 | 3.5 |
| Comparative Example 3 | 3.7 |

Referring to [Table 5], Examples 1 to 5 received gloss evaluation points of 4.0 or more on average, but Comparative Examples 1 to 3 received relatively low points of 3.5 to 3.7. Accordingly, it can be seen that the butter cream according to the present invention has better texture than that of the butter cream in the related art.

Figure 2:
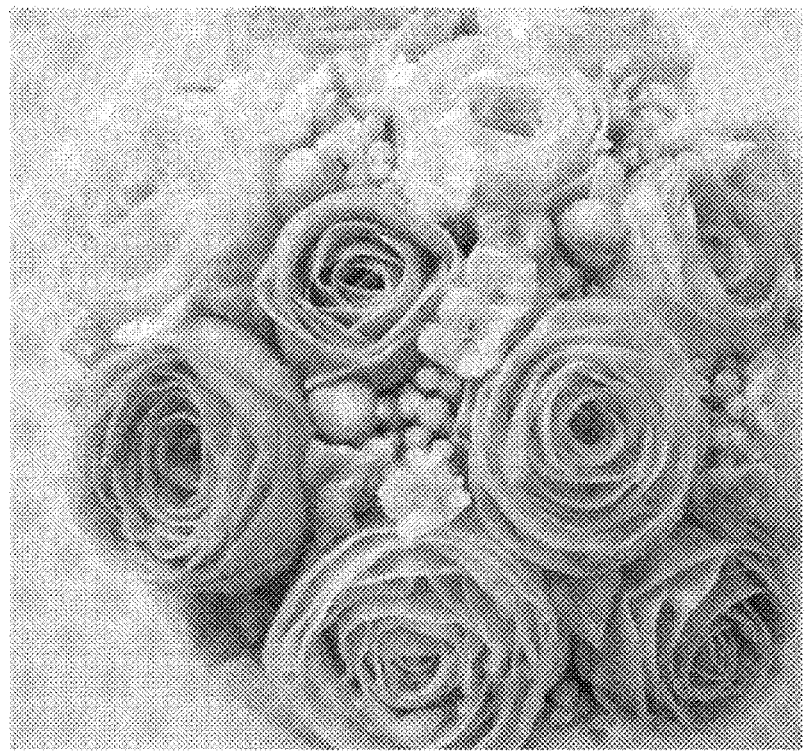
FIGS. 2 to 4 illustrate flower cakes made by using butter cream according to the present invention.
Figure 3:
Figure 4:
Figure 5:
FIGS. 5 and 6 illustrate flower cakes made by using butter cream in the related art.
Figure 6:

FIGS. 2 to 4 illustrate flower cakes made by using butter cream according to the present invention, and FIGS. 5 and 6 illustrate flower cakes made by using butter cream in the related art. Referring to FIGS. 2 to 6, it can be seen that when the flower cakes are made by using butter cream according to the present invention, it is possible to secure better transparency, gloss, and texture than those of the flower cakes made by using butter cream in the related art.

The present invention has been described above with reference to preferred exemplary embodiments of the present invention, but a person with ordinary skill in the art can understand that the present invention may be modified and changed in various ways without departing from the spirit and scope of the present invention described in the following claims.

MODE FOR INVENTION FOR CARRYING OUT THE INVENTION

Related contents have been described in Best Mode for Carrying Out the Invention as described above.

INDUSTRIAL APPLICABILITY

The present invention may be used in bakery, confectionery, cakes, dessert, and the like.

The invention claimed is:

1. A butter cream for making a cake, the butter cream prepared by a process comprising:
    adding first sugar to meringue having bubbles formed by whipping egg whites;
    preparing first sweetened meringue by whipping a mixture of the first sugar and the meringue until a meringue cone is formed on the meringue;
    preparing sugar syrup by mixing and heating water and second sugar and then heating a mixture of the water and the second sugar;
    obtaining second sweetened meringue by adding the sugar syrup to the first sweetened meringue and whipping a mixture of the sugar syrup and the first sweetened meringue;
    adding butter, which is in a state of being maintained at 0° C. to 12° C., to the second sweetened meringue; and
    whipping a mixture of the butter and the second sweetened meringue until moisture is reduced.

2. The butter cream of claim 1, wherein the egg whites are present in an amount of 135 g to 155 g parts by weight, the first sugar is present in an amount of 20 g to 40 g parts by weight, the water is present in an amount of 25 g to 45 g parts by weight, the second sugar is present in an amount of 120 g to 140 g parts by weight, and the butter is present in an amount of 440 g to 460 g parts by weight.

3. The butter cream of claim 1, wherein the egg whites are whipped in a state of being maintained at 20° C. to 23° C.

4. The butter cream of claim 1, wherein the second sweetened meringue is obtained by adding the sugar syrup to the first sweetened meringue, whipping the mixture of the sugar syrup and the first sweetened meringue until the temperature becomes 0° C. to 30° C., and adding the butter thereto.

5. The butter cream of claim 1, wherein the mixture of the water and the second sugar is heated at 118° C. to 120° C.

6. The butter cream of claim 1, wherein in the preparing of the first sweetened meringue, an amount of the egg whites and the first sugar has a ratio of 1:1.

7. A method for preparing a butter cream for making a cake, the method comprising:
    preparing meringue having bubbles formed by whipping egg whites;
    obtaining first sweetened meringue by adding first sugar to the meringue and then whipping a mixture of the first sugar and the meringue until a meringue cone is formed on the meringue;
    preparing sugar syrup by mixing water and second sugar and then heating a mixture of the water and the second sugar;
    obtaining second sweetened meringue by adding the sugar syrup to the first sweetened meringue and whipping the mixture of the sugar syrup and the first sweetened meringue;
    adding butter, which is in a state of being maintained at 0° C. to 12° C., to the second sweetened meringue; and whipping a mixture of the butter and the second sweetened meringue until moisture is reduced.

8. The method of claim 7, wherein the whipping of the mixture of the butter and the second sweetened meringue continues until the butter may absorb the moisture, and further includes obtaining the butter cream after the moisture is completely absorbed in the butter.

9. The method of claim 7, wherein in the preparing of the meringue having bubbles formed by whipping the egg whites, the egg whites are whipped in a state of being maintained at 20° C. to 23° C.

10. The method of claim 7, wherein the obtaining of the second sweetened meringue includes whipping the mixture of the sugar syrup and the first sweetened meringue until the temperature becomes 0° C. to 30° C. and adding the butter thereto.

11. The method of claim 7, wherein in the preparing of the sugar syrup, the mixture of the water and the second sugar is heated at 118° C. to 120° C.

* * * * *